(12) United States Patent
Hamme et al.

(10) Patent No.: US 11,760,273 B2
(45) Date of Patent: Sep. 19, 2023

(54) SYSTEM AND METHOD FOR CREATING A SEALED ENCLOSURE FOR A LOUDSPEAKER IN A VEHICLE BODY PORTION

(71) Applicant: HARMAN INTERNATIONAL INDUSTRIES, INCORPORATED, Stamford, CT (US)

(72) Inventors: Bradford Hamme, Canton, MI (US); Yann Lecoeur, Aichi (JP); Savion Zaire-Jonah Thompson, Stamford, CT (US); Rishi Daftuar, Ypsilanti, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/332,119

(22) Filed: May 27, 2021

(65) Prior Publication Data
US 2022/0379819 A1  Dec. 1, 2022

(51) Int. Cl.
| | |
|---|---|
| *B60R 11/02* | (2006.01) |
| *B60J 5/10* | (2006.01) |
| *H04R 31/00* | (2006.01) |
| *H04R 1/02* | (2006.01) |
| *B60R 11/00* | (2006.01) |

(52) U.S. Cl.
CPC ............ *B60R 11/0217* (2013.01); *B60J 5/10* (2013.01); *H04R 1/02* (2013.01); *H04R 31/00* (2013.01); *B60R 2011/0019* (2013.01); *H04R 2499/13* (2013.01)

(58) Field of Classification Search
CPC .......... B60R 11/0217; B60R 2011/0019; B60J 5/10; H04R 1/02; H04R 31/00; H04R 2499/13
See application file for complete search history.

(56) References Cited

U.S. PATENT DOCUMENTS

| | | | | |
|---|---|---|---|---|
| 5,218,175 A | * | 6/1993 | Scarlata | H04R 1/2857 181/150 |
| 7,313,247 B1 | * | 12/2007 | Tilli | H04R 1/025 381/86 |
| 8,045,744 B2 | * | 10/2011 | Close | H04R 1/028 381/86 |
| 10,631,081 B2 | | 4/2020 | Wheeler et al. | |
| 2001/0030078 A1 | * | 10/2001 | Jones | H04R 1/025 181/150 |
| 2007/0080264 A1 | * | 4/2007 | Kukucka | H04R 5/02 248/27.1 |

(Continued)

FOREIGN PATENT DOCUMENTS

JP         2004208067 A * 7/2004 ............... H04R 1/02

*Primary Examiner* — Oyesola C Ojo
(74) *Attorney, Agent, or Firm* — Brooks Kushman P.C.

(57) ABSTRACT

A system and method for creating a sealed enclosure for a loudspeaker in a vehicle body portion of a vehicle are provided, the vehicle body portion including an inner body panel having a first internal surface and an outer body panel having a second internal surface, wherein the inner body panel and the outer body panel are spaced apart to define a cavity therebetween. The system includes at least one insert member arranged to be received within the cavity and coupled to the first internal surface and the second internal surface to partition the cavity and create the sealed enclosure for the loudspeaker.

16 Claims, 5 Drawing Sheets

(56) References Cited

U.S. PATENT DOCUMENTS

| | | | |
|---|---|---|---|
| 2015/0172799 A1* | 6/2015 | O'Neal | B60R 11/0217 |
| | | | 381/77 |
| 2016/0159260 A1* | 6/2016 | Subat | B29C 45/14336 |
| | | | 29/458 |
| 2021/0354535 A1* | 11/2021 | Harada | B60J 5/0416 |
| 2022/0032855 A1* | 2/2022 | Kim | B60R 11/02 |
| 2022/0089098 A1* | 3/2022 | Mutsura | B60R 11/0217 |

* cited by examiner

SYSTEM AND METHOD FOR CREATING A SEALED ENCLOSURE FOR A LOUDSPEAKER IN A VEHICLE BODY PORTION

TECHNICAL FIELD

Embodiments relate to a system and method for creating a sealed enclosure for a loudspeaker in a vehicle body portion.

BACKGROUND

In vehicles, loudspeakers such as subwoofers are often housed in large enclosures within the vehicle interior that take up significant space and add unnecessary weight. In an effort to be less obtrusive, subwoofers may alternatively be mounted between an inner body panel and an outer body panel in a vehicle. However, the sheet metal or trim pieces may have gaps or holes and thus fail to provide a truly sealed enclosure. The result may be insufficient back pressure for the subwoofer, an inability to completely seal off the rear wave of the subwoofer from the interior of the vehicle, and a degradation in the performance of the subwoofer and in the sound quality produced.

SUMMARY

In one or more embodiments, a system for creating a sealed enclosure for a loudspeaker in a vehicle body portion of a vehicle is provided, the vehicle body portion including an inner body panel having a first internal surface and an outer body panel having a second internal surface, wherein the inner body panel and the outer body panel are spaced apart to define a cavity therebetween. The system includes at least one insert member arranged to be received within the cavity and coupled to the first internal surface and the second internal surface to partition the cavity and create the sealed enclosure for the loudspeaker.

In one or more embodiments, the at least one insert member is arranged to be positioned within the cavity to limit a volume of the sealed enclosure to comprise between about 30% to 40% of a volume of the cavity. The at least one insert member may be affixed to the first internal surface and the second internal surface using an adhesive. The at least one insert member may be mounted generally perpendicular to the inner body panel and the outer body panel to improve rigidity and reduce vibration of the vehicle body portion. In one or more embodiments, the at least one insert member may include a plurality of insert members arranged to form one or more of an upper boundary, a lower boundary, or a side boundary of the sealed enclosure. The plurality of insert members may be arranged to be coupled to each other to form the sealed enclosure. In one or more embodiments, the vehicle body portion may include a liftgate. The at least one insert member may be positioned in the liftgate below tail light openings in the outer body panel.

In one or more embodiments, a loudspeaker assembly for a vehicle body portion of a vehicle is provided, the vehicle body portion including an inner body panel having a first internal surface and an outer body panel having a second internal surface, wherein the inner body panel and the outer body panel are spaced apart to define a cavity therebetween. The loudspeaker assembly includes a subwoofer arranged to be mounted in an aperture in the inner body panel, and at least one insert member arranged to be received within the cavity and coupled to the first internal surface and the second internal surface to partition the cavity and create a sealed enclosure for the subwoofer.

In one or more embodiments, a method for creating a sealed enclosure system for a loudspeaker in a vehicle body portion of a vehicle is provided, the vehicle body portion including an inner body panel having a first internal surface and an outer body panel having a second internal surface, wherein the inner body panel and the outer body panel are spaced apart to define a cavity therebetween. The method includes providing at least one insert member, inserting the at least one insert member into the cavity between the inner body panel and the outer body panel, and coupling the at least one insert member to the first internal surface and the second internal surface to partition the cavity and create a sealed enclosure for the loudspeaker.

In one or more embodiments, the at least one insert member may be inserted through an aperture in the inner body panel that is arranged to receive the loudspeaker. The loudspeaker may include a subwoofer, and the method may include mounting the subwoofer in the aperture after inserting the at least one insert member. In one or more embodiments, inserting the at least one insert member does not require altering the inner body panel or the outer body panel. The method may include mounting the at least one insert member generally perpendicular to the inner body panel and the outer body panel to improve rigidity and reduce vibration of the vehicle body portion. The method may include positioning the at least one insert member within the cavity to limit a volume of the sealed enclosure to comprise between about 30% to 40% of a volume of the cavity.

In one or more embodiments, inserting the at least one insert member may include inserting a plurality of insert members to form one or more of an upper boundary, a lower boundary, or a side boundary of the sealed enclosure. The plurality of insert members may be coupled to each other to form the sealed enclosure. Coupling the at least one insert member may include affixing the at least one insert member to the first internal surface and the second internal surface using an adhesive. In one or more embodiments, the vehicle body portion may include a liftgate. The method may include positioning the at least one insert member in the liftgate below tail light openings in the outer body panel.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
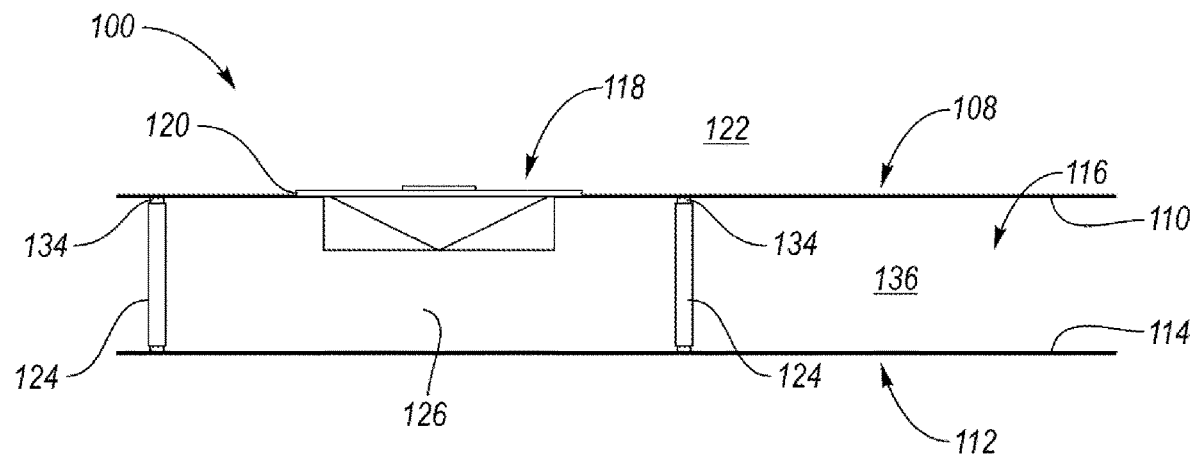
FIG. 1 is a schematic illustration of a vehicle body portion and one or more insert members received therein for creating a sealed enclosure for a loudspeaker, such as a subwoofer, in a cavity between an inner body panel and an outer body panel.

With reference first to FIG. 1, a top view of a vehicle body portion 100 is schematically illustrated. Examples of a vehicle body portion 100 may include, but are not limited to, a liftgate 102 (FIGS. 2-6), a door 104 (FIG. 7), or a trunk area 106 (FIG. 8) of a vehicle. The vehicle body portion 100 includes a first, inner body panel 108 having a first internal surface 110 and a second, outer body panel 112 having a second internal surface 114, where the inner body panel 108 and the outer body panel 112 are spaced apart to define a cavity 116 therebetween. A loudspeaker such as, but not limited to, a subwoofer 118 may be mounted in an aperture 120 in the inner body panel 108 and operable to transmit sound into a vehicle interior 122.

Figure 2:
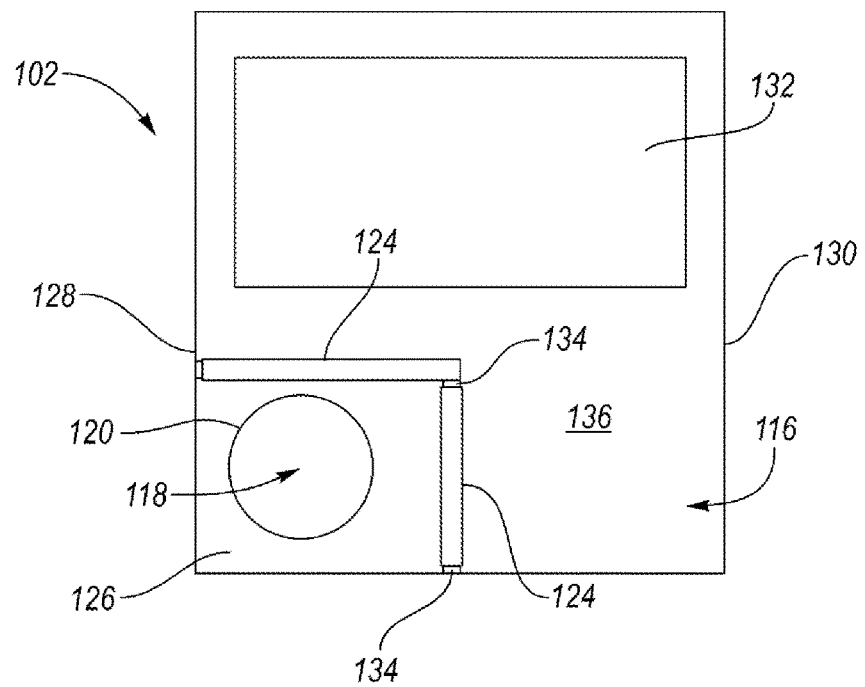
FIG. 2 is a schematic illustration of one or more insert members creating a sealed enclosure for a loudspeaker mounted in a liftgate of a vehicle.

In one or more embodiments, such as illustrated in FIGS. 1 and 2, at least one insert member 124 is provided and arranged to be received within the cavity 116 to partition the cavity 116 and thereby create a sealed enclosure 126 for the subwoofer 118. One or more insert members 124 may be arranged to be coupled, affixed, or adhered to the first internal surface 110 and the second internal surface 114 of the inner and outer body panels 108, 112. In this way, the currently unused space in the cavity 116 between the inner body panel 108 and the outer body panel 112 can be sealed into an enclosure 126 using one or more insert members 124 instead of consuming space with an enclosure in the vehicle interior 122. In addition, the insert member 124 can be installed to create the sealed enclosure 126 after manufacturing of the vehicle, and therefore applied as an option based on the trim level of the vehicle.

The sealed enclosure 126 improves performance parameters of the subwoofer 118, such as sound pressure level (SPL), frequency response, and total harmonic distortion (THD). As described further below, the sealed enclosure 126 is created between the existing inner body panel 108 and outer body panel 112 without having to alter the inner or outer body panels 108, 112 and while only adding minimal mass to the vehicle body portion 100. In contrast to conventional enclosures, the sealed enclosure 126 disclosed herein provides a more efficient use of space in the vehicle and with reduced enclosure weight while still achieving the desired speaker output characteristics.

Figure 3:
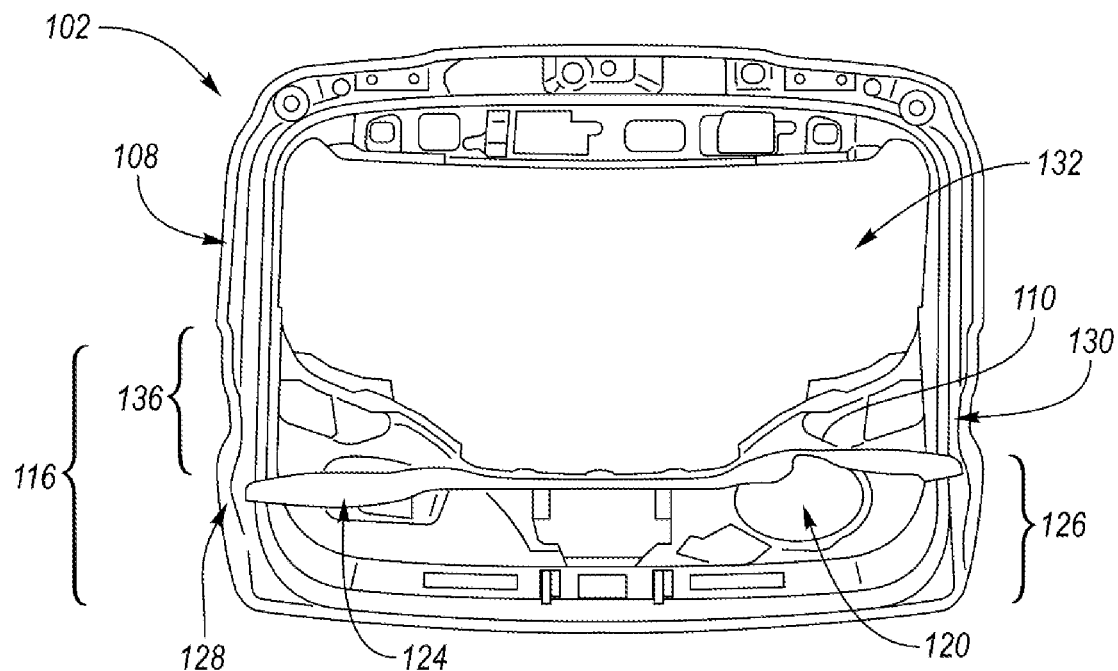
FIG. 3 illustrates an insert member in a liftgate according to one or more embodiments as viewed from an interior of the vehicle with an inner body panel removed.
Figure 4:
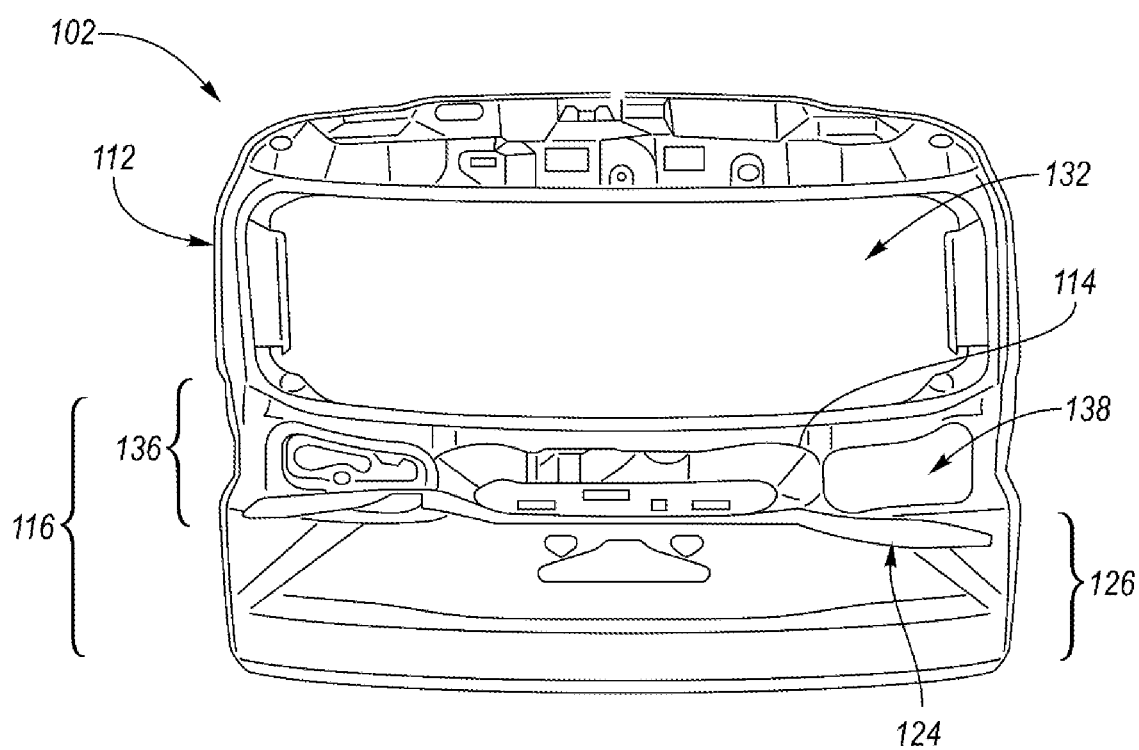
FIG. 4 is a view of the insert member of FIG. 3 as viewed from an exterior of the vehicle with an outer body panel removed.
Figure 5:
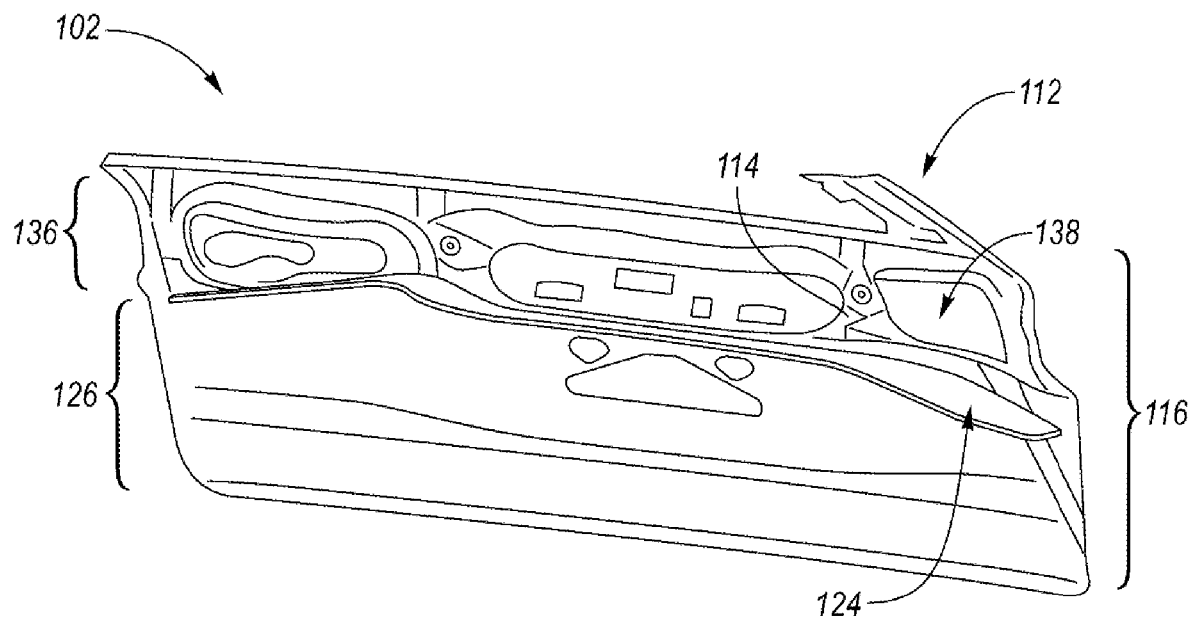
FIG. 5 is a bottom perspective view of the insert member of FIG. 4.
Figure 6:
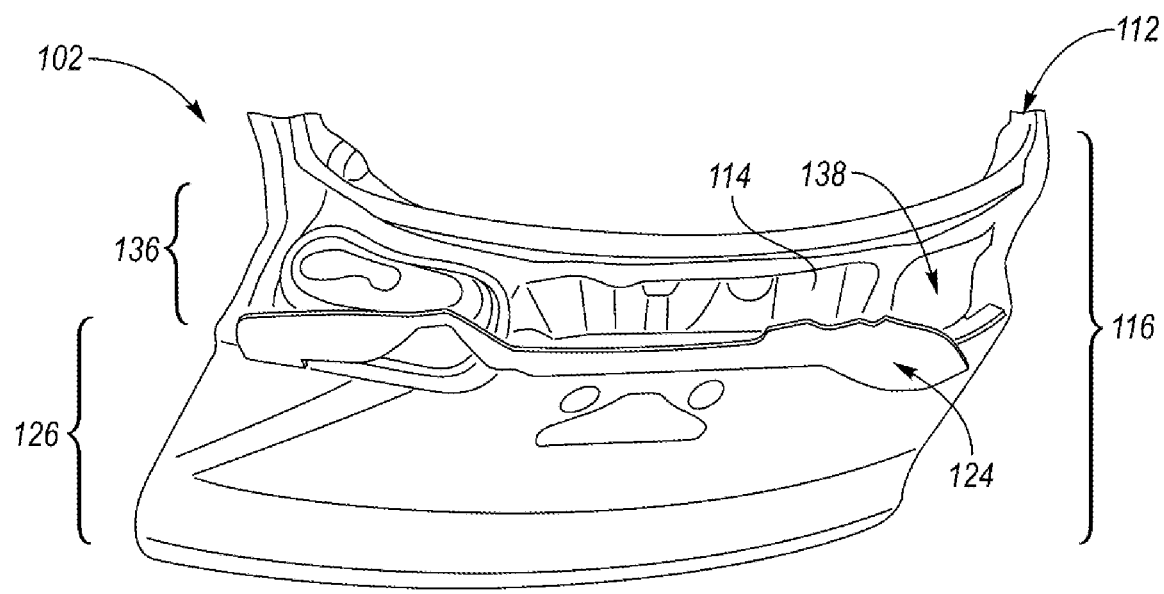
FIG. 6 is a top perspective view of the insert member of FIG. 4.

FIG. 3 illustrates an insert member 124 in a liftgate 102 according to one or more embodiments as viewed from an interior 122 of the vehicle with the inner body panel 108 removed. FIGS. 4-6 illustrate the insert member 124 in the liftgate 102 as viewed from an exterior of the vehicle with the outer body panel 112 removed. In one or more embodiments, the insert member 124 may have a shape and dimensions designed to be custom fit to an existing shape of the internal surfaces 110, 114 of the inner and outer body panels 108, 112.

The insert member 124 can be placed in any position within the cavity 116 and may have any shape, length, width and thickness appropriate for creating the sealed enclosure 126 and tuning the resonance and driver output of the subwoofer 118. For example, in addition to extending between the first internal surface 110 of the inner body panel 108 and the second internal surface 114 of the outer body panel 112, the insert member 124 may extend from a first end 128 to a second end 130 of the vehicle body portion 100 (e.g. liftgate 102; FIGS. 3-6). The one or more insert members 124 could also be attached to additional internal surfaces within the vehicle body portion 100. It is understood that the insert member 124 is not limited to the shapes and dimensions shown herein. As illustrated in FIGS. 1-2 and 7-8, a plurality of insert members 124 could be used to form upper, lower, and/or side boundaries of the sealed enclosure 126. A plurality of insert members 124 could also be arranged adjacent to each other and coupled, connected or adhered together to form the sealed enclosure 126.

It is understood that the one or more insert members 124 may form an enclosure 126 with any shape and volume sufficient for the subwoofer 118 utilized and the vehicle body portion 100 in which it is located. For example, the sealed enclosure 126 may be efficiently sized with respect to the size of the subwoofer 118 and the maximum movement area of the subwoofer 118. In one or more embodiments, a volume of the enclosure 126 is less than a volume of the cavity 116 in the vehicle body portion 100. In one non-limiting example, the volume of the cavity 116 in a liftgate 102 between the inner and outer body panels 108, 112 below a rear window opening 132 may be approximately 50-60 L. In one or more embodiments, the at least one insert member 124 may be positioned within the cavity 116 to limit the volume of the sealed enclosure 126 to comprise approximately 30-40% of the volume of the cavity 116.

Use of the insert member 124 between the inner and outer body panels 108, 112 increases the overall rigidity of the vehicle body portion 100 (e.g. liftgate 102). The at least one insert member 124 may be mounted generally perpendicular to the inner body panel 108 and the outer body panel 112 to improve rigidity and reduce vibration of the vehicle body portion 100. The inner and outer body panels 108, 112 are typically constructed from sheet metal which may not be capable of withstanding back pressure from the subwoofer 118 during operation, leading to unwanted noise in the vehicle interior 122. In operation, subwoofers 118 displace the surfaces they are mounted to, so by improving the rigidity of the inner and outer body panels 108, 112 and the vehicle body portion 100, the efficiency at which the subwoofer 118 can operate is improved and optimal phase alignment is facilitated due to a reduction or elimination of rear phase exposure in the vehicle interior 122. In addition, use of the insert member 124 disclosed herein provides the benefit of reducing vibration of the inner body panel 108 and outer body panel 112 which, in turn, reduces audible sounds classified as BSR (buzz, squeak and rattle) in the vehicle interior 122.

The insert member 124 may be constructed from a stiff or rigid material such as, but not limited to, MDF (mediumdensity fiberboard), wood, stamped metal, fiberglass, reinforced fiber plastic, resin, thermoplastic or composites. In one or more embodiments, the insert member 124 may be constructed from a substantially similar material to the material of the inner and outer body panels 108, 112 such that any expansion or adhesion difficulties between the parts may be minimized. The thickness of the insert member 124 may be selected based on speaker output parameters, back pressure values, resonances of the subwoofer 118, and/or flexibility of the inner and outer body panels 108, 112 in combination with the flexibility of the insert member 124, for example. In one or more embodiments, the weight of the insert member 124 may be minimized, especially in a movable vehicle body portion 100 such as the liftgate 102 which may or may not be powered, and in electric vehicles.

The one or more insert members 124 can be attached to the first and second internal surfaces 110, 114 in a sealing manner in order to create the enclosure 126. In one non-limiting embodiment, the insert member 124 may be affixed using an adhesive 134, wherein the adhesive 134 may add structural integrity to the inner and outer body panels 108, 112 while creating the sealed enclosure 126. The adhesive 134 may be applied once the insert member 124 is positioned in a desired location between the inner body panel 108 and outer body panel 112. Alternatively, the adhesive 134 could be pre-applied to at least one of the first internal surface 110 and the second internal surface 114 before introducing the insert member 124 into position in the cavity 116 or engaging the first or second internal surfaces 110, 114. The adhesive 134 could then be activated by heat or vibration once the insert member 124 is in place. As another alternative, the adhesive 134 could include a two-part epoxy, such as with an activator sprayed on the first and second internal surfaces 110, 114. In this example, once the insert member 124 is in the desired position, a curing process of the adhesive 134 may be initiated. In other embodiments, the insert member 124 may be attached, for example, to the first internal surface 110 and the second internal surface 114 by welding or other attachment methods.

Embodiments disclosed herein also include a method of installing at least one insert member 124 in a vehicle body portion 100 to create a sealed enclosure 126 for a loudspeaker, such as a subwoofer 118. The method includes inserting the insert member 124 into the cavity 116 between the inner body panel 108 and the outer body panel 112 and attaching the insert member to the first and second internal surfaces 110, 114 to create the sealed enclosure 126 within the vehicle body portion 100. In one or more embodiments, the insert member 124 may be inserted into the cavity 116 through the aperture 120 in the inner body panel 108 that is arranged to receive the subwoofer 118.

In base model vehicles that do not include a subwoofer 118, there may not be a need to install the insert member 124. Accordingly, the insert member 124 and method for installation thereof disclosed herein may be reserved for premium grade vehicle packages, allowing base grade vehicle systems without a subwoofer upgrade to avoid additional parts, weight and cost. The manufacturer may thus keep mass reduced on non-premium vehicles, and then add the insert member 124 as an aftermarket installation for higher trim option vehicles with a subwoofer 118 without requiring tear up or dismantling of the inner or outer body panels 108, 112. By not permanently affixing the insert member 124 in all vehicles, unnecessary parts, weight and cost are avoided if a subwoofer 118 is not selected as an option for a particular vehicle.

In a typical vehicle, countermeasures (e.g. seals, padding, etc.) may be used to seal holes that exist in the structure of the inner and outer body panels 108, 112 of the vehicle body portion 100 for optimal performance of the subwoofer 118. Treating an entire vehicle body portion 100 with countermeasures can add weight and cost to the vehicle and be a time-consuming process for the manufacturer. In electric vehicles and/or in vehicles without a powered liftgate 102, for example, added weight is even more undesirable. Advantageously, use of one or more insert members 124 as disclosed herein will partition the cavity 116 into the sealed enclosure 126 and a remaining volume 136 of the cavity 116. Only holes in the inner body panel 108 and outer body panel 112 which are part of the sealed enclosure 126 need to be considered for treating with countermeasures while the remaining volume 136 need not be treated with countermeasures.

For example, in one or more embodiments the insert member 124 may be positioned in the liftgate 102 below the openings 138 for the tail lights since these tail light openings 138 cannot be sealed. The remaining volume 136 of the cavity 116 above the insert member 124 and/or outside of the sealed enclosure 126 may then remain unsealed and without countermeasures, thereby reducing the amount of the liftgate 102 that the manufacturer needs to seal. With this partitioning of the cavity 116, the remaining volume 136 of the cavity 116 outside of the sealed enclosure 126 may then be streamlined and used efficiently for other functions, such as a positioning area for wiring and harnesses or the like.

Figure 7:
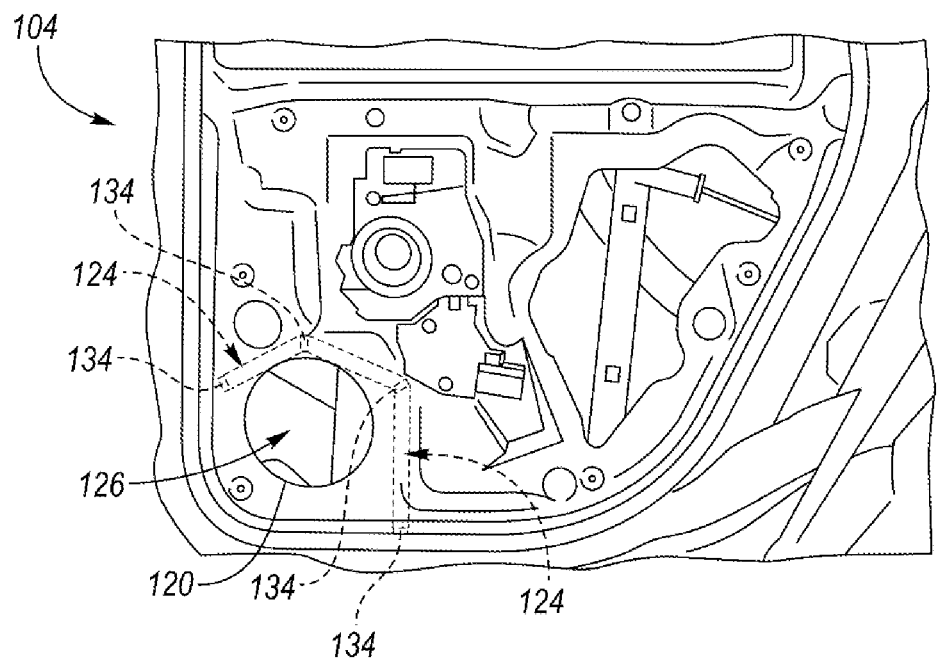
FIG. 7 is a schematic illustration of one or more insert members creating a sealed enclosure for a loudspeaker in a vehicle door between an inner and outer panel thereof according to another embodiment.
Figure 8:
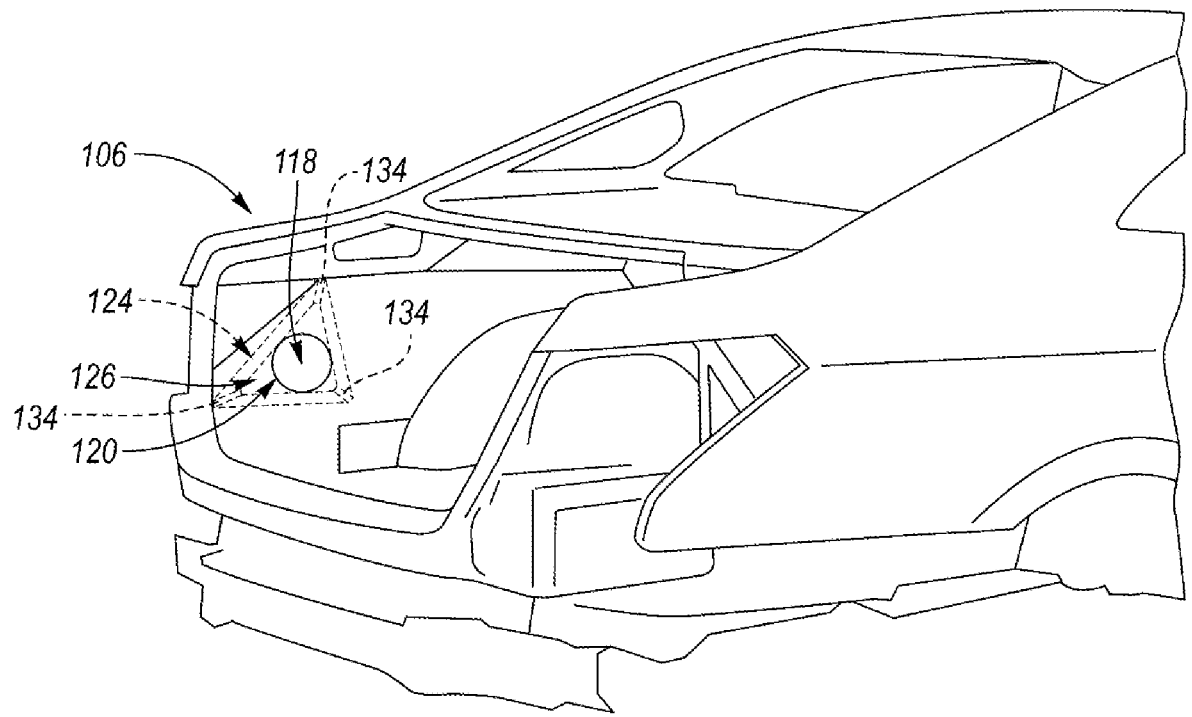
FIG. 8 is a schematic illustration of one or more insert members creating a sealed enclosure for a loudspeaker in a vehicle trunk or rear quarter panel area between an inner and outer panel thereof according to another embodiment.

While exemplary locations of the subwoofer 118, the one or more insert members 124 and the defined sealed enclosure 126 have been shown and described herein, it is understood that other locations within the liftgate 102 or other vehicle body portions 100 are also contemplated. With reference to FIG. 7, an embodiment is illustrated wherein insert members 124 create a sealed enclosure 126 in a vehicle door 104. With reference to FIG. 8, an embodiment is illustrated wherein insert members 124 define a sealed enclosure 126 in a vehicle trunk area 106. It is understood that the features shown and described for the implementation of one or more insert members 124 in a liftgate 102 are also applicable to the embodiments in the vehicle door 104 and the vehicle trunk area 106 shown in FIGS. 7-8. As above with the liftgate 102, while a particular number, location and configuration of the insert member(s) 124 and the sealed enclosure 126 are depicted herein, it is understood that other locations within the vehicle door 104 or vehicle trunk area 106 are also contemplated. Furthermore, the at least one insert member 124 disclosed herein could be used to create a sealed enclosure 126 for a subwoofer 118 or other loudspeaker in any vehicle body portion 100 where two spaced vehicle body panels exist.

Figure 9:
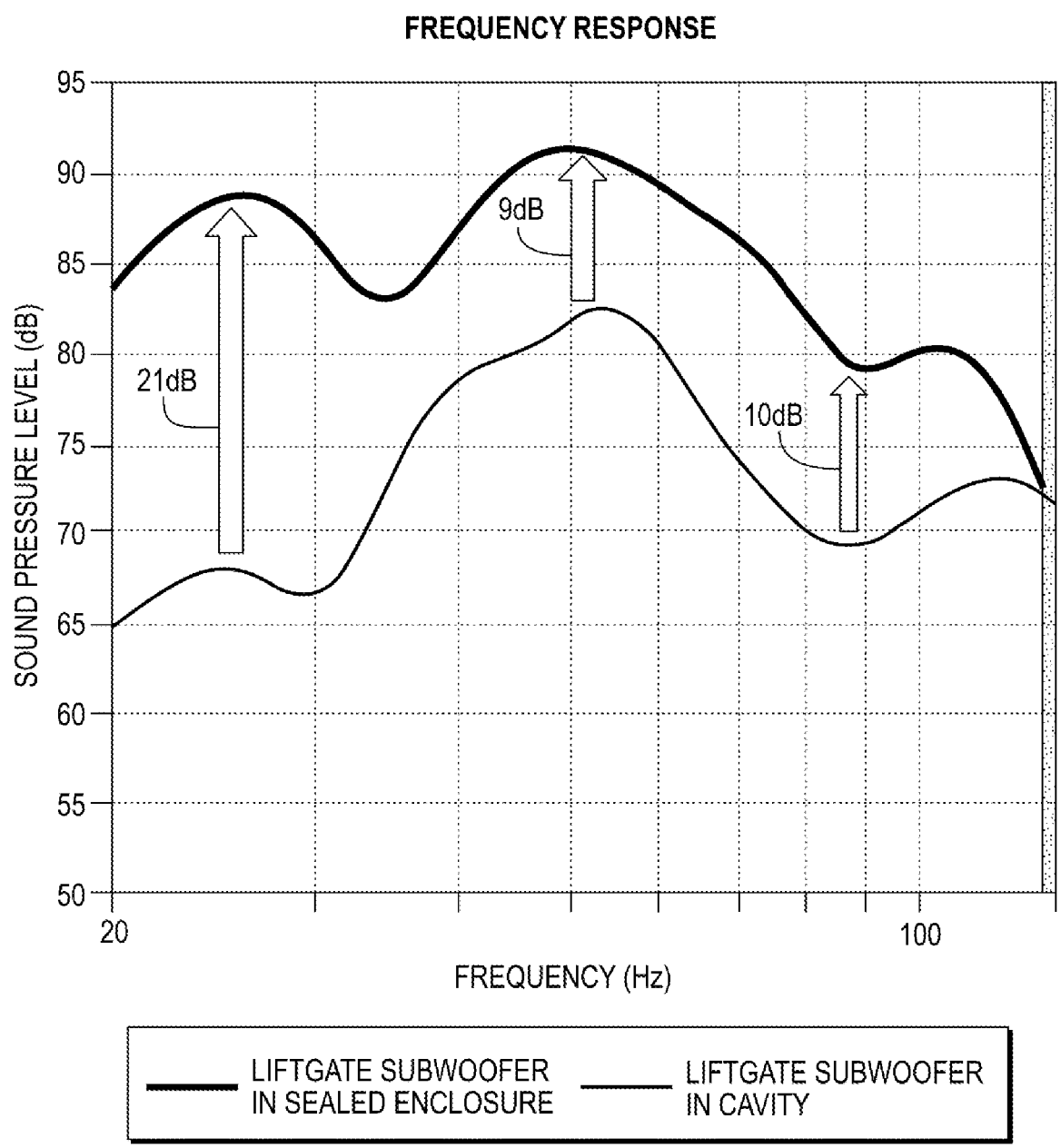
FIG. 9 is a graph illustrating the improved performance of a liftgate subwoofer with an insert member according to embodiments disclosed herein compared to the performance of a liftgate subwoofer without an insert member.

Turning now to FIG. 9, a graph illustrating the frequency response of a subwoofer 118 in a sealed enclosure 126 of a liftgate 102 created by one or more insert members 124 as disclosed herein is depicted compared to a subwoofer 118 installed in the open volume of the cavity 116 of the liftgate 102. As shown, there are significant increases in the SPL output performance of the subwoofer 118 in the sealed enclosure 126 as compared to the subwoofer 118 in the larger volume of the cavity 116 of the liftgate 102, with an increase in performance of greater than 20 dB of output improvement below 30 Hz, 9 dB more output at 50 Hz, and 10 dB greater output at 90 Hz.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for creating a sealed enclosure for a loudspeaker within a liftgate of a vehicle, the liftgate including an inner body panel having a first internal surface and an outer body panel having a second internal surface, wherein the inner body panel and the outer body panel are spaced apart to define a cavity therebetween wherein the loudspeaker is disposed, the system comprising at least one insert member arranged to be received within the cavity and affixed to the first internal surface and the second internal surface to attach the inner body panel to the outer body panel to partition the cavity and create the sealed enclosure for the loudspeaker, the sealed enclosure bounded by the inner body panel, the outer body panel, and the at least one insert member, wherein the at least one insert member is mounted generally perpendicular to the inner body panel and the outer body panel to improve rigidity and reduce vibration of the inner and outer body panels.

2. The system of claim 1, wherein the at least one insert member is arranged to be positioned within the cavity to limit a volume of the sealed enclosure to comprise between about 30% to 40% of a volume of the cavity.

3. The system of claim 1, wherein the at least one insert member is affixed to the first internal surface and the second internal surface using an adhesive.

4. The system of claim 1, wherein the at least one insert member includes a plurality of insert members arranged to form one or more of an upper boundary, a lower boundary, or a side boundary of the sealed enclosure.

5. The system of claim 4, wherein the plurality of insert members are arranged to be coupled to each other to form the sealed enclosure.

6. The system of claim 1, wherein the at least one insert member is positioned within the cavity of the liftgate below tail light openings in the outer body panel.

7. A loudspeaker assembly for a liftgate of a vehicle, the liftgate including an inner body panel having a first internal surface and an outer body panel having a second internal surface, wherein the inner body panel and the outer body panel are spaced apart to define a cavity therebetween, the loudspeaker assembly comprising:
a subwoofer arranged to be mounted in an aperture in the inner body panel and within the cavity of the liftgate; and
at least one insert member arranged to be received within the cavity and affixed to the first internal surface and the second internal surface to attach the inner body panel to the outer body panel to partition the cavity and create a sealed enclosure for the subwoofer, the sealed enclosure bounded by the inner body panel, the outer body panel, and the at least one insert member, wherein the at least one insert member is mounted generally perpendicular to the inner body panel and the outer body panel to improve rigidity and reduce vibration of the inner and outer body panels, and wherein the at least one insert member is positioned within the cavity of the liftgate below tail light openings in the outer body panel.

8. A method for creating a sealed enclosure for a loudspeaker within a liftgate of a vehicle, the liftgate including an inner body panel having a first internal surface and an outer body panel having a second internal surface, wherein the inner body panel and the outer body panel are spaced apart to define a cavity therebetween wherein the loudspeaker is disposed, the method comprising:
providing at least one insert member;
inserting the at least one insert member into the cavity between the inner body panel and the outer body panel, wherein the at least one insert member is mounted generally perpendicular to the inner body panel and the outer body panel to improve rigidity and reduce vibration of the inner and outer body panels; and
affixing the at least one insert member to the first internal surface and the second internal surface to attach the inner body panel to the outer body panel to partition the cavity and create the sealed enclosure for the loudspeaker, the sealed enclosure bounded by the inner body panel, the outer body panel, and the at least one insert member.

9. The method of claim 8, wherein the at least one insert member is inserted through an aperture in the inner body panel that is arranged to receive the loudspeaker.

10. The method of claim 9, wherein the loudspeaker includes a subwoofer, the method further comprising mounting the subwoofer in the aperture after inserting the at least one insert member.

11. The method of claim 8, wherein inserting the at least one insert member does not require altering the inner body panel or the outer body panel.

12. The method of claim 8, further comprising positioning the at least one insert member within the cavity to limit a volume of the sealed enclosure to comprise between about 30% to 40% of a volume of the cavity.

13. The method of claim 8, wherein inserting the at least one insert member includes inserting a plurality of insert members to form one or more of an upper boundary, a lower boundary, or a side boundary of the sealed enclosure.

14. The method of claim 13, wherein the plurality of insert members are coupled to each other to form the sealed enclosure.

15. The method of claim 8, wherein affixing the at least one insert member to the first internal surface and the second internal surface is accomplished using an adhesive.

16. The method of claim 8, further comprising positioning the at least one insert member within the cavity of the liftgate below tail light openings in the outer body panel.

* * * * *